Oct. 1, 1968 S. J. AWAD 3,404,239

AUTOMATIC DIALING ATTACHMENT FOR TELEPHONES

Filed Dec. 7, 1964

INVENTOR.
SIEFE J. AWAD

BY E. H. Schmidt

ATTORNEY.

3,404,239
AUTOMATIC DIALING ATTACHMENT FOR TELEPHONES

Siefe J. Awad, 2331 W. Utopia Drive, Miramar, Fla. 33023

Filed Dec. 7, 1964, Ser. No. 416,575
7 Claims. (Cl. 179—90)

My invention relates generally to mechanical telephone dialers and is directed particularly to an improved and simplified mechanical attachment device for dial telephones operative, when activated, to dial the call number of a preselected remote telephone subscriber station.

The principal object of the invention is to provide a mechanical dialer of the above nature which will be simple in structure, easy to install, dependable in operation and inexpensive to manufacture.

Still another object is to provide a mechanical dialer of the character described that, other than for its electric energizing motor, is entirely mechanical in operation, and thus devoid of solenoids and other electrical components subject to malfunction and dependent upon individual sources of electrical supply for proper operation.

A more particular object is to provide a mechanical dialer of the character above described which, because of its simplicity, dependability and low cost, is especially well suited for use in conjunction with a surveillance system for automatically calling the police department, for example, as the remote station, to give a prerecorded message informing of break-in or fire at the premises of the calling station.

Other objects, features and advantages of the invention will be apparent from the following description when read with reference to the accompanying drawings. In the drawings, wherein like reference numerals denote corresponding parts throughout the several views.

Figures 1, 2, 3, 4, 5, 6, 7:
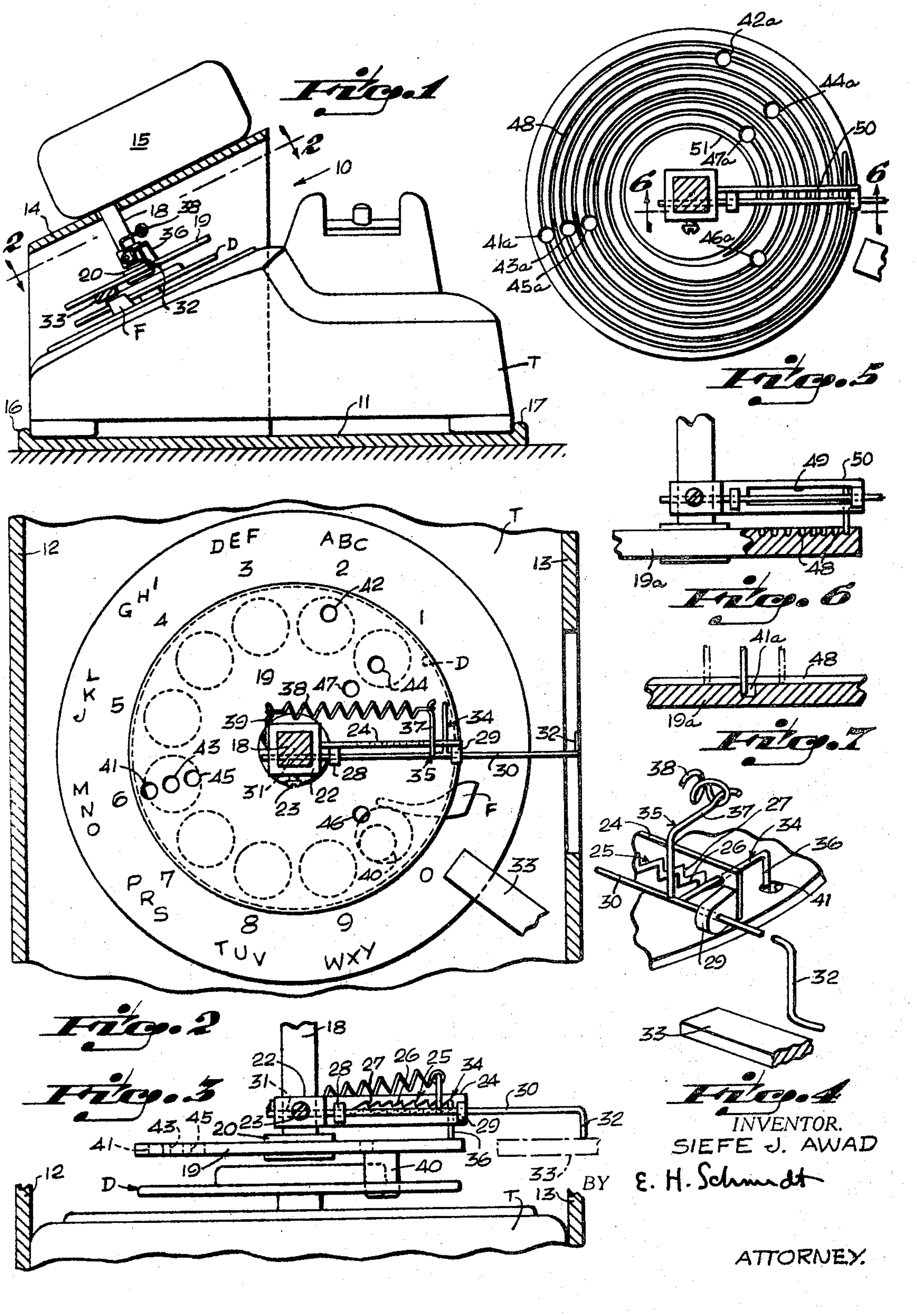
FIG. 1 is a side elevational view of a desk type dial telephone equipped with an automatic dialing attachment embodying the invention, shown partly in vertical cross-section.
FIG. 2 is a cross-sectional view taken along the line 2—2 of FIG. 1 in the direction of the arrows and illustrating the dialing disc and associated mechanism in plan view.
FIG. 3 is a side elevational view of the dialing mechanism illustrating operation of the cam-actuated indexing mechanism thereof.
FIG. 4 is a fragmentary perspective view of the indexing mechanism.
FIG. 5 is a plan view of an alternative form of the invention utilizing a helically grooved dialing disc for advancing the selector arm.
FIG. 6 is a vertical cross-sectional view taken along the line 6—6 of FIG. 5 in the direction of the arrows.
FIG. 7 is a vertical cross-sectional view taken along a portion of the helical groove of the dialing disc shown in FIG. 5 and illustrating how the selector arm falls into one of the groove recesses in its engagement therein.

Referring now in detail to the drawings, 10 designates, generally, a preferred form of an automatic dialing attachment embodying the invention shown attached to a desk type dial telephone T having the usual ten digit rotary disc D with finger holes for manually dialing remote station subscriber call numbers. The dialing attachment 10 comprises a flat support base portion 11 having upwardly-extending, spaced, parallel side walls 12, 13 interjoined, at their upper ends by an inclined top plate 14 upon which is secured an electric drive motor 15. The support base portion 11 is formed with short front and back upstanding walls 16, 17, respectively, engaging front and rear portions of the feet of the telephone unit T, and the side walls 12, 13 are spaced for close fit therebetween of the telephone unit, so that the top plate 14 is so arranged as to be in spaced parallel relation with respect to the telephone rotary disc D when the telephone unit seated or attached to the dialing attachment device 10.

The electric motor 15 is of the type including a gear reduction mechanism reducing the rotary speed of the output drive shaft 18 to about 8 revolutions per minute, and said motor is so attached to the top plate 14 that its drive shaft 18 is coaxial with the axis of rotation of the telephone rotary disc D and terminates just short thereof. Rotatably journaled to the outer end of the drive shaft 18 is a circular dialing disc 19, said journalling means preferably comprising a ball bearing assembly 20.

The drive shaft 18, which is preferably of square cross-section above the dialing disc 19, has fixed thereto, as by a square collar portion 22 thereof with a set screw 23, a substantially radially outwardly-projecting indexing arm 24 having formed along its length a saw-tooth slot 25 having inclined tooth slot portions 26 and substantially upright or perpendicular tooth slot portions 27.

The inner and outer ends of the indexing arm 24 are provided with sidewardly-extending bosses 28, 29 drilled with aligned openings to receive therein for rotative and longitudinal movement with respect to said indexing arm, a selector rod 30, said selector rod at its inner end being received for free passage in a bore 31 passing through the drive shaft 18 and collar 22. The outer end of the selector rod 30 is downwardly bent to provide a cam follower portion 32 adapted to be actuated by a cam bar 33 fixed with respect to the base portion 11, as is best illustrated in FIGS. 2 and 4, and as is hereinbelow more particularly described.

Fixed to the selector rod 30 at a central position therealong as by welding or the like, is a sidewardly extending selector arm 34 and an upwardly-extending spring attachment arm 35. The selector arm 34 extends through the saw-tooth slot 25 and terminates in a downwardly-turned finger portion 36 which normally rests upon the upper surface of the dialing disc 19. The spring attachment arm 35 is formed with a sidewardly-extending spring attachment portion 37 extending in the same general direction as the selector arm 34 and lying above said selector arm in substantially spaced, parallel relation. A tension spring 38 is hooked between the outer end of the spring attachment portion 37 and a hook 39 secured to the drive shaft 18. The tension spring 38 is arranged so as to resiliently urge the spring attachment portion 37 of the spring attachment arm 35 downwardly and inwardly (as seen in FIG. 3) so that the end of the finger portion 36 of the selector arm 34 normally rests resiliently against the upper surface of the dialing disc 19. As illustrated in FIGS. 2 and 3, the underside of the dialing disc 19 has fixed thereto a zero finder peg 40 of such size and position as to fit within the "zero" opening of the telephone rotary disc D when the dialing device is attached to the telephone so that said rotary disc will be driven for rotation in unison with said dialing disc, in the manner hereinafter described.

The dialing disc 19 is provided with a series of circular openings 41 through 47 angularly and radially located on the dialing disc 19 in accordance with the numerical values and digital sequence of a call sign or number of the predetermined remote station to be called. For example, referring to the rest position of the dialing disc as illustrated in FIG. 2, the openings 41 through 47 relate, respectively, to numerals 6261601 comprising the sign or number to be called, and said numbers will be picked up and dialed by interengagement in corresponding openings of the openings 41 through 47 of the finger portion 36 of the selector arm 34 in the manner now to be described.

Upon energization of the electric drive motor 15, such as by operation of an associated burglar or fire alarm device, for example, the clockwise rotational movement of the drive shaft 18 from its rest position (as illustrated in FIG. 2) will carry along the selector rod 30 and its associated indexing arm support mechanism. Since the finger portion 36 of the selector rod 30 will be riding upon the top of the dialing disc 19, it will slide therealong until it arrives at opening 41, which, as illustrated, lies over and therefore corresponds to the first numeral (6) of the call number of the remote station to be dialed. At this instant, the finger portion 36 will fall into and hook within the opening 41 and carry the dialing disc 19 along in its rotational movement. The telephone rotary disc D, being joined for rotary movement in unison with the dialing disc 19 by means of the zero finder peg 40 as described above, will be rotated along with said dialing disc to dial the first number. When the rotary disc D reaches the position for its release normally determined by the finger step F (FIG. 2), the cam follower portion 32 of the selector rod 30 will just have reached the cam bar 33, whereupon said selector rod will be turned anti-clockwisely to lift the finger portion 36 of the selector arm 34 out of the dialing disc opening 41, whereupon said dialing disc and the telephone rotary disc D will be returned to rest position under the influence of the return spring associated with the telephone dialing mechanism. The anti-clockwise turning of the selector arm 34 as described above will cause it to move upwardly in the saw-tooth slot 25, from its lowermost position in the first tooth perpendicular slot portion 27 (as seen in FIG. 4), to the uppermost position therein, whereupon, under the influence of the tension spring 38, said selector arm will be moved inwardly and downwardly along the adjacent inclined tooth slot portion 26 to come to rest at the bottom thereof. The finger portion 36 will now be displaced radially inwardly by an amount equal to the pitch or distance between the teeth of the saw-tooth slot 25, and since the radial spacing between the successive dialing disc openings 41 through 47 in their order to be actuated is of equal amount, said finger portion in its continued rotation will thereafter catch successively in the openings 42 through 47 for dialing the predetermined telephone 6261601 in the manner described above in connection with the automatic dialing of the first call numeral 6. At the completion of the dialing operation, the selector rod 30 and its associated selector arm 34 will have moved to an innermost position having no corresponding opening in the dialing disc 19, so that no further dialing can take place.

FIGS. 5, 6 and 7 illustrate a modification of my invention differing from that of FIGS. 1 through 4 described above only in that a spiral groove is utilized instead of a saw-tooth slot for advancing the selector rod mechanism. As illustrated in FIGS. 5, 6 and 7, the dialing disc 19*a* is formed in its upper surface with a spiral groove 48 in the path of which recesses 41*a* through 47*a* are formed, one in each successive loop or turn and so positioned as to correspond with the call or number of the predetermined remote station to be dialed or called. The finger portion 36*a* of the selector arm 34 normally seats within the groove 48 to be guided therealong, said selector arm passing freely through an elongated opening 49 in the support arm 50. Upon reaching the first opening 41*a*, corresponding to the first numeral "6" of the call number to be dialed, the selector rod finger portion 36*a* will fall in to catch the dialing disc 19*a* and carry it along for dialing said first numeral. Upon reaching the finger release position, the cam follower portion (not illustrated) of the selector rod 30*a* will ride upon the cam bar 33*a* (partially shown in FIG. 5) which will lift the finger portion 36*a* just enough to withdraw it from the opening 41*a* without withdrawing it from the spiral groove 48. Continued rotation of the selector rod 30*a* and its associated mechanism will effect successive engagement of the remaining dialing disc recesses 42*a* through 47*a* to dial the corresponding predetermined remote station call number 6261601. At the completion of the dialing operation, the selector arm finger portion 36*a* will be guided to a circular groove 51, without recesses, where it will continue to track without further actuation of the dialing mechanism as long as the drive motor remains energized.

It is to be understood that while my invention is described and illustrated herein as comprising only an automatic dialing mechanism, such mechanism will normally be used in association with other apparatus for lifting the hand-set off its cradle to activate the telephone dialing mechanism, and for playing a prerecorded message into the handset microphone once the receiver is picked up for listening at the called remote station. Such apparatus is known in the art and is therefore not further described herein. The salient feature of my invention resides in the provision of a simple, inexpensive and dependable dialing mechanism which can be used in conjunction with such apparatus to provide a surveillance system for warning the police or others at a preselected remote station of break-in or fire, for example.

While I have illustrated and described herein only two forms in which my invention can conveniently be embodied in practice, it is to be understood that these forms are given by way of example only, and not in a limiting sense. My invention, in brief, comprises all the embodiments and modifications coming within the scope and spirit of the following claims.

What I claim as new and desire to secure by Letters Patent is:

1. An automatic dialing attachment device for use with a rotary disc dial telephone set comprising, in combination, a motor having a rotary drive output shaft, means for supporting said output shaft in coaxial relation with respect to the rotary axis of the rotary disc dial of a telephone set, a dialing disc rotatably journalled on said output shaft, means interconnecting said dialing disc with the telephone rotary disc dial for their rotation in unison, a selector arm connected to said output shaft for rotation therewith and for radial movement with respect thereto and having a finger portion slidable against one side of said dialing disc, a plurality of catch means on said dialing disc and operative to be engaged in sequence by said finger portion for carrying said dialing disc in rotary motion along with said drive shaft, means for disengaging each catch means at a particular angular position of said selector arm during each cycle of revolution of said drive shaft, and means for advancing said finger portion during each cycle of revolution of said drive shaft into a new position whereat it will engage the next successive catch means.

2. An automatic dialing attachment device for use with a rotary disc dial telephone set as defined in claim 1 wherein said catch means comprise a plurality of recesses in said dialing disc, at decreasing radial distances from said shaft in accordance with their sequential order of operation, and of differing angular position in accordance with their rotative angle to be advanced.

3. An automatic dialing attachment device for use with a rotary disc dial telephone set as defined in claim 2 wherein said finger portion advancing means comprises a spiral groove formed in said one side of said dialing disc along which said finger portion is guided, said plurality of recesses being formed in spaced relation along said spiral groove.

4. An automatic dialing attachment device for use with a rotary disc dial telephone set as defined in claim 3 wherein said disengaging means comprises a stationary cam bar, said selector arm having a cam follower portion operative to slide over said cam bar at said particular angular position for lifting said finger portion from an engaged recess.

5. An automatic dialing attachment device for use with a rotary disc dial telephone set as defined in claim 4 including spring means resiliently urging said finger portion against said one side of said dialing disc and radially inwardly with respect to said drive shaft.

6. An automatic dialing attachment device for use with a rotary disc dial telephone set as defined in claim 2 wherein said finger portion advancing means comprises an indexing arm fixed to said drive shaft and extending substantially radially therefrom, said indexing arm having a saw-tooth slot along its length, said selector arm extending substantially perpendicular to said indexing arm, said finger portion extending perpendicularly from said selector arm which extends through said saw-tooth slot, and yieldable means normally urging said selector arm radially inwardly with respect to said drive shaft and rotatively about its longitudinal axis, the arrangement being such that when said finger portion is engaged in a recess, the part thereof extending through said slot will be at the bottom of one of the saw-teeth thereof.

7. An automatic dialing attachment device for use with a rotary disc dial telephone set as defined in claim 6 wherein said disengaging means comprises a stationary cam bar, said selector arm having a cam follower portion operative to slide over said cam bar at said particular angular position for lifting said finger portion from an engaged recess.

No reference cited.

KATHLEEN H. CLAFFY, *Primary Examiner.*

A. H. GESS, *Assistant Examiner.*